US012565591B2

(12) United States Patent
Tyrell

(10) Patent No.: US 12,565,591 B2
(45) Date of Patent: Mar. 3, 2026

(54) INK COMPOSITION, PRODUCT, LIQUID RESIN COMPOSITION, AND PRODUCED MATTER

(71) Applicant: SHOEI CHEMICAL INC., Tokyo (JP)

(72) Inventor: Paul Tyrell, Corvallis, OR (US)

(73) Assignee: SHOEI CHEMICAL INC., Tokyo (JP)

( * ) Notice: Subject to any disclaimer, the term of this patent is extended or adjusted under 35 U.S.C. 154(b) by 815 days.

(21) Appl. No.: 17/759,483

(22) PCT Filed: Jan. 22, 2021

(86) PCT No.: PCT/JP2021/002287
§ 371 (c)(1),
(2) Date: Jul. 26, 2022

(87) PCT Pub. No.: WO2021/153460
PCT Pub. Date: Aug. 5, 2021

(65) Prior Publication Data
US 2023/0054844 A1      Feb. 23, 2023

Related U.S. Application Data

(60) Provisional application No. 62/966,466, filed on Jan. 27, 2020.

(51) Int. Cl.
| | |
|---|---|
| *C09D 11/033* | (2014.01) |
| *C09D 11/037* | (2014.01) |
| *C09K 11/70* | (2006.01) |

(52) U.S. Cl.
CPC .......... *C09D 11/033* (2013.01); *C09D 11/037* (2013.01); *C09K 11/70* (2013.01)

(58) Field of Classification Search
CPC ... C09D 11/033; C09D 11/037; C09K 11/025; C09K 11/70; C09K 11/08
See application file for complete search history.

(56) References Cited

U.S. PATENT DOCUMENTS

| | | |
|---|---|---|
| 2010/0283072 A1 | 11/2010 | Kazlas et al. |
| 2012/0113671 A1 | 5/2012 | Sadasivan et al. |

FOREIGN PATENT DOCUMENTS

| | | | |
|---|---|---|---|
| CN | 10656318 | * | 4/2017 |
| JP | 2012172135 A | | 9/2012 |
| JP | 2019096442 A | | 6/2019 |
| JP | 2019131758 A | | 8/2019 |
| JP | 2020012100 A | | 1/2020 |
| WO | WO 2017/080318 | * | 5/2017 |
| WO | 2019079037 A1 | | 4/2019 |

OTHER PUBLICATIONS

International Bureau of WIPO, Notification of Transmittal of Translation of the International Preliminary Report on Patentability Issued in Application No. PCT/JP2021/002287, Aug. 11, 2022, WIPO, 2 pages.
International Bureau of WIPO, International Preliminary Report on Patentability Issued in Application No. PCT/JP2021/002287, Jul. 28, 2022, WIPO, 12 pages.

* cited by examiner

*Primary Examiner* — C Melissa Koslow
(74) *Attorney, Agent, or Firm* — Alleman Hall LLP

(57) ABSTRACT

An ink composition according to an embodiment of the present invention, comprising: a volatile solvent; and dispersed in the volatile solvent, a plurality of semiconductor nanoparticles each coordinated to a plurality of organic ligands, wherein a ratio by mass of the semiconductor nanoparticles to the volatile solvent is greater than 1:1. A product according to an embodiment of the present invention comprising: a solid substrate; and arranged on the solid substrate, a dried residue of an ink composition, the dried residue comprising a plurality of semiconductor nanoparticles arranged without an intervening polymer matrix, wherein the a plurality of semiconductor nanoparticles each coordinated to a plurality of organic ligands.

7 Claims, 8 Drawing Sheets

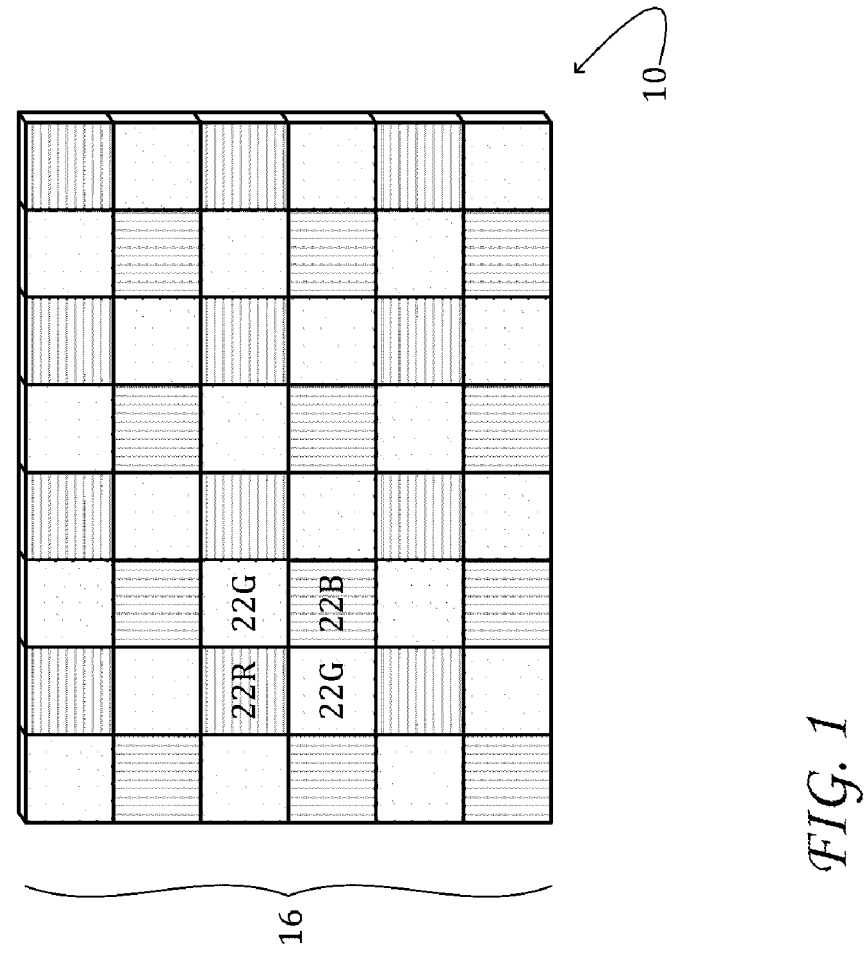
*FIG. 1*
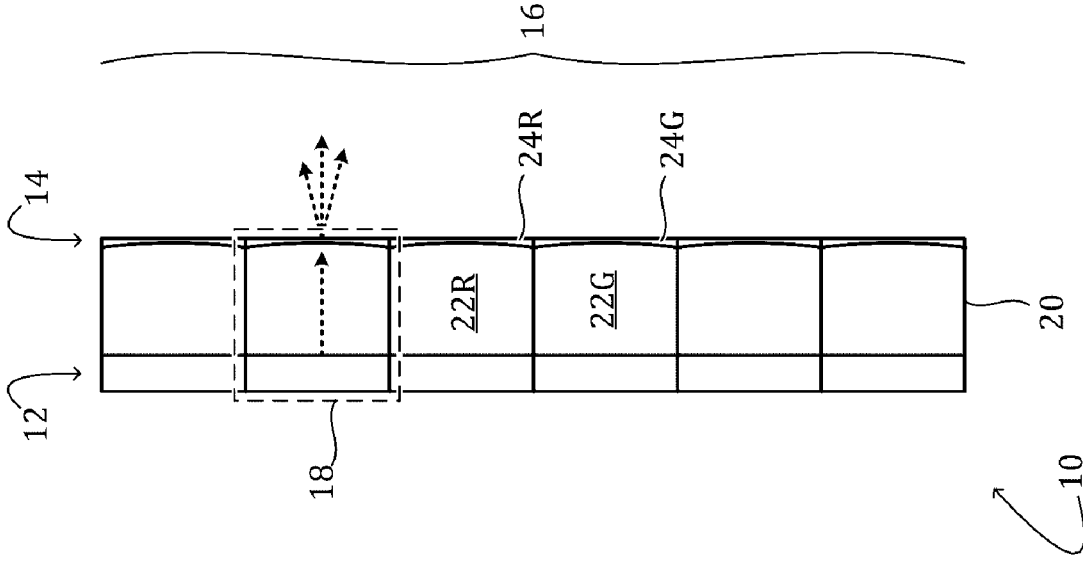

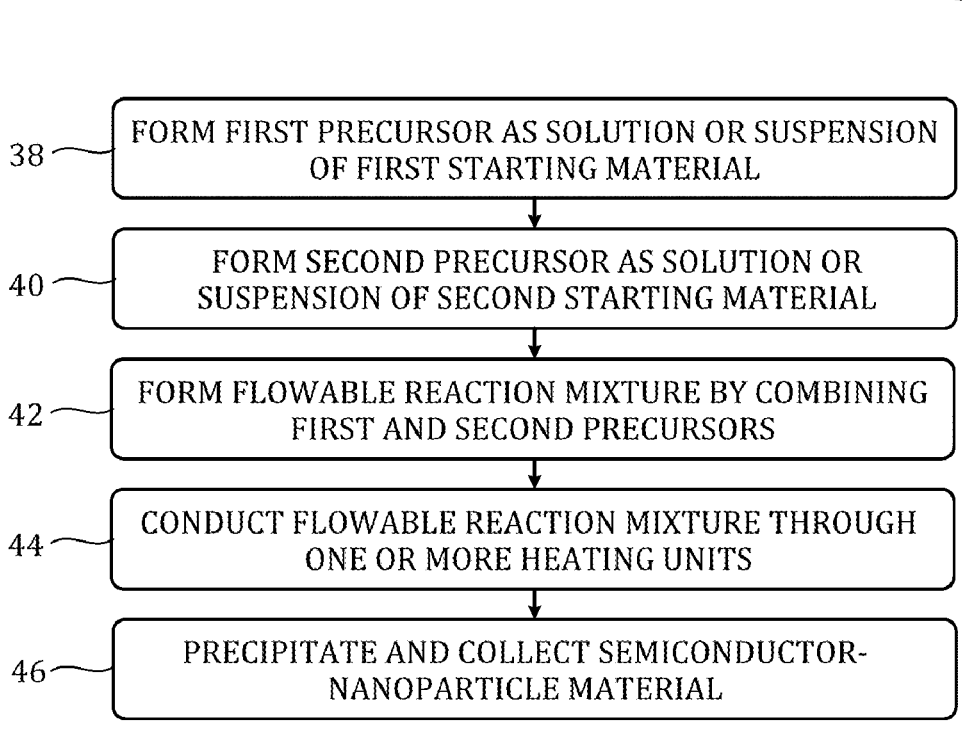

36

| | |
|---|---|
| 38 | FORM FIRST PRECURSOR AS SOLUTION OR SUSPENSION OF FIRST STARTING MATERIAL |
| 40 | FORM SECOND PRECURSOR AS SOLUTION OR SUSPENSION OF SECOND STARTING MATERIAL |
| 42 | FORM FLOWABLE REACTION MIXTURE BY COMBINING FIRST AND SECOND PRECURSORS |
| 44 | CONDUCT FLOWABLE REACTION MIXTURE THROUGH ONE OR MORE HEATING UNITS |
| 46 | PRECIPITATE AND COLLECT SEMICONDUCTOR-NANOPARTICLE MATERIAL |

*FIG. 3*

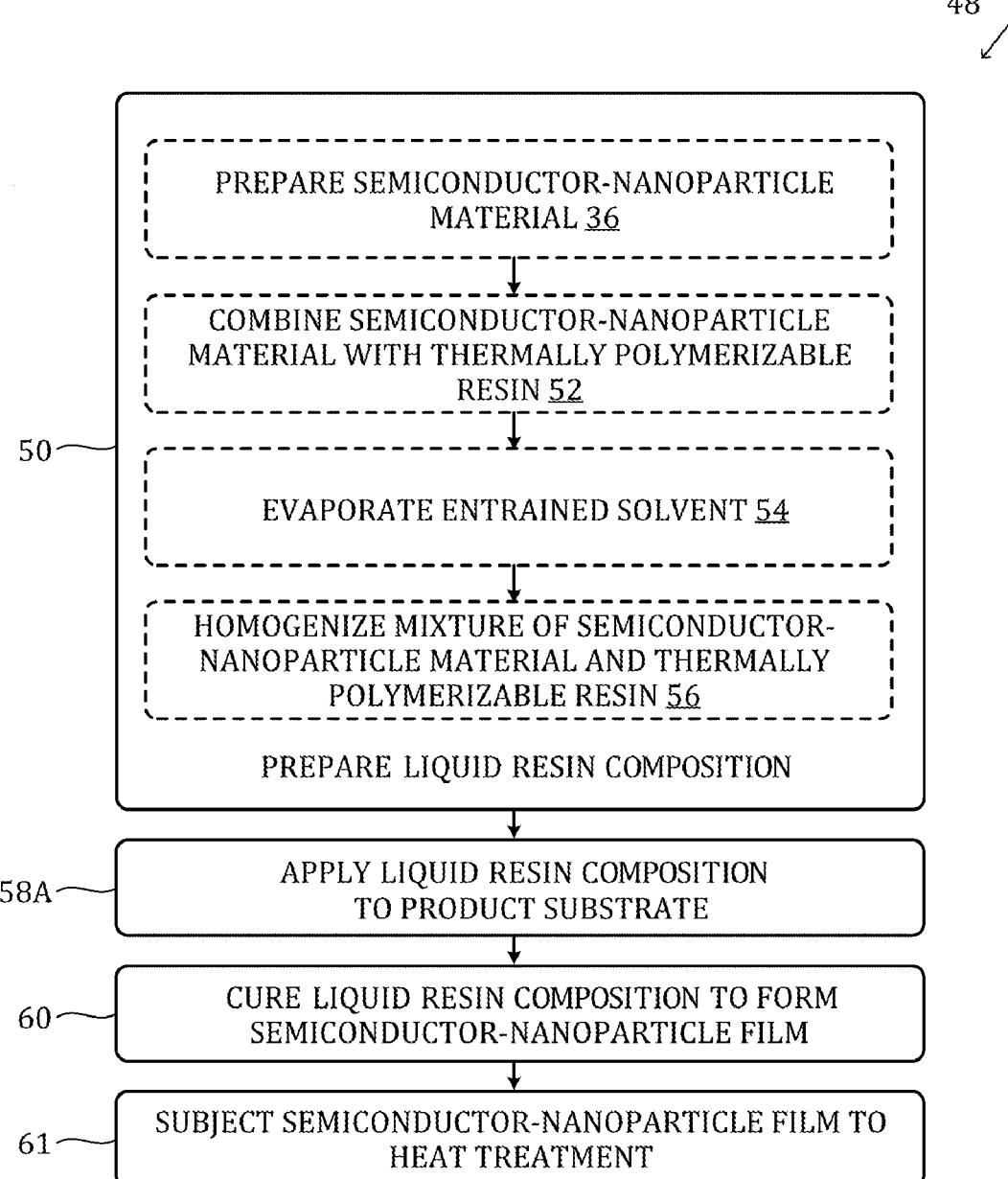

48

PREPARE SEMICONDUCTOR-NANOPARTICLE MATERIAL 36

COMBINE SEMICONDUCTOR-NANOPARTICLE MATERIAL WITH THERMALLY POLYMERIZABLE RESIN 52

EVAPORATE ENTRAINED SOLVENT 54

HOMOGENIZE MIXTURE OF SEMICONDUCTOR-NANOPARTICLE MATERIAL AND THERMALLY POLYMERIZABLE RESIN 56

PREPARE LIQUID RESIN COMPOSITION

50

APPLY LIQUID RESIN COMPOSITION TO PRODUCT SUBSTRATE

58A

CURE LIQUID RESIN COMPOSITION TO FORM SEMICONDUCTOR-NANOPARTICLE FILM

60

SUBJECT SEMICONDUCTOR-NANOPARTICLE FILM TO HEAT TREATMENT

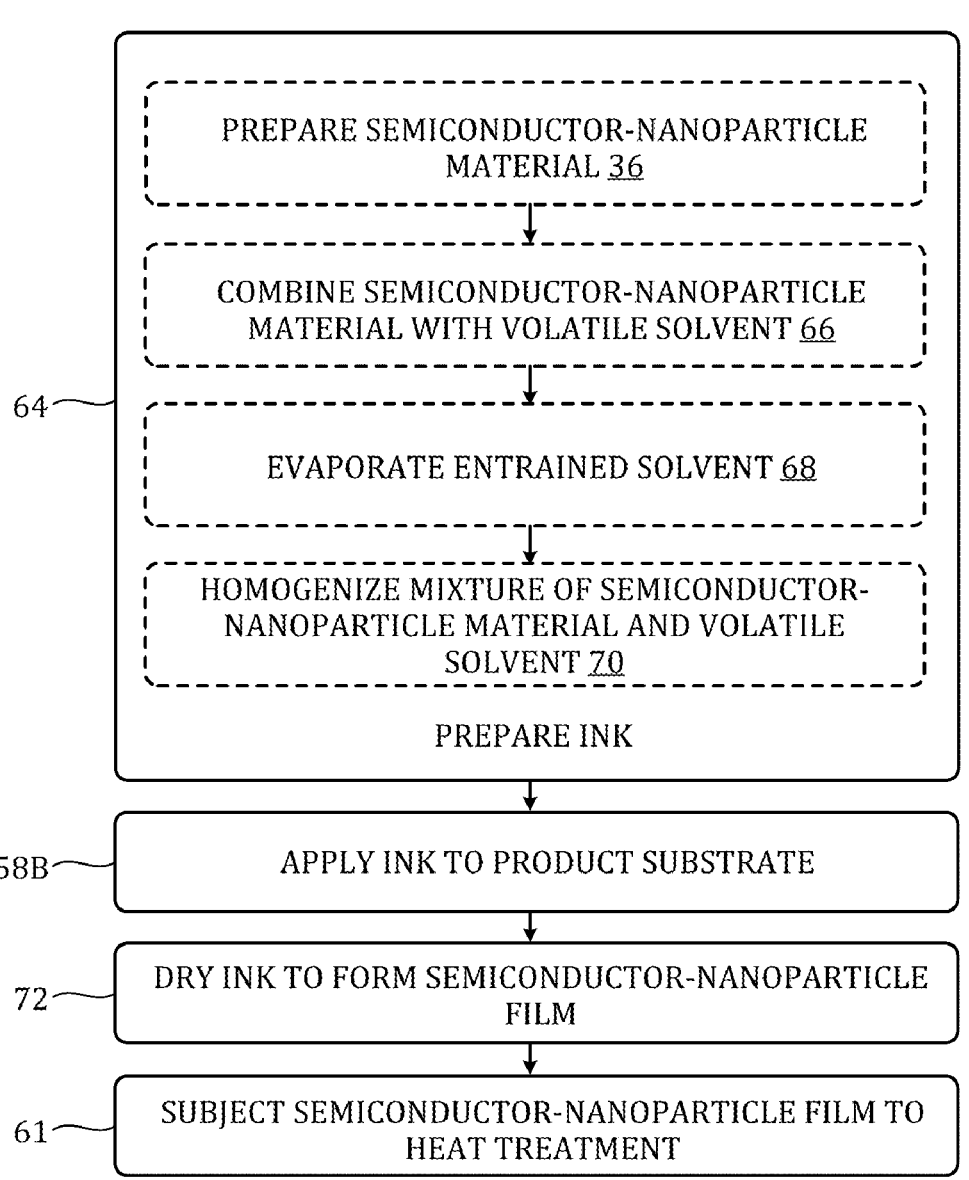
*FIG. 5*

INK COMPOSITION, PRODUCT, LIQUID RESIN COMPOSITION, AND PRODUCED MATTER

This application is an application claiming priority US Provisional Application No. 62/966,466 filed Jan. 27, 2020, and the content of the US Provisional Application is incorporated herein by reference.

TECHNICAL FIELD

The present invention relates to ink composition, product, liquid resin composition, and produced matter.

BACKGROUND ART

A quantum dot is a nanoparticle small enough to show evidence of quantum confinement. In the quantum-confinement size regime, the nanoparticle's small dimensions spatially confine the excitons generated therein. Various optical properties of a quantum dot are size-dependent, therefore, and tunable provided that quantum dots of the desired size can be isolated. This feature is useful in products based on quantum-dot photoemission, such as fluorescent down converters, light-emitting diodes and diode lasers, and in products based on photoinduced charge-carrier transport, such as photon detectors and photovoltaics.

CITATION LIST

Patent Literature

[Patent Literature 1] U.S. Patent Application Publication No. 2012/0113671.
[Patent Literature 2] U.S. Patent Application Publication No. 2010/0283072.
[Patent Literature 3] International Patent Publication No. WO2019/079037

SUMMARY OF INVENTION

Technical Problem

As noted above, quantum-dots with size-selectable optical properties are used in various manufactured products. In some products, the quantum dots are dispersed onto a solid substrate in the form of a printed film or coating. The source of the quantum dots for product manufacture may be a liquid wherein quantum dots of the desired size distribution are dispersed in a volatile solvent and/or curable matrix. Liquids having higher quantum-dot concentrations may be more desirable for product manufacture than liquids having comparatively lower quantum-dot concentrations. In particular, a single application of high quantum-dot concentration may provide the same coverage as multiple and/or thicker applications of lower quantum-dot concentration (For example, refer to Patent Literature 1 to 3, etc.). By reducing the number or thickness of the applications, drying, curing, and/or other thermal post-processing durations may be reduced, and the quality of the product may be improved. However, quantum-dots may have limited solubility in common solvents and other matrices. This feature makes it difficult to apply suitably concentrated dispersions to substrates of interest.

Therefore, an object of the present invention is to provide an ink composition or the like containing semiconductor nanoparticles at a higher concentration.

Solution to Problem

The ink composition according to the embodiment of the present invention is an ink composition, comprising:
a volatile solvent; and
dispersed in the volatile solvent, a plurality of semiconductor nanoparticles each coordinated to a plurality of organic ligands, wherein a ratio by mass of the semiconductor nanoparticles to the volatile solvent is greater than 1:1.

Advantageous Effects of Invention

According to the present invention, it is possible to provide an ink composition or the like containing semiconductor nanoparticles at a higher concentration.

BRIEF DESCRIPTION OF DRAWINGS

FIG. 1 shows aspects of an example product in the form of a color-display structure.

FIG. 3 shows aspects of an example method to synthesize a semiconductor-nanoparticle material.

FIG. 4 shows aspects of an example method to manufacture a produced matter having a semiconductor-nanoparticle film arranged on a substrate.

FIG. 5 shows aspects of another example method to manufacture a product having a semiconductor-nanoparticle film arranged on a substrate.

DESCRIPTION OF EMBODIMENTS

Figure 2:
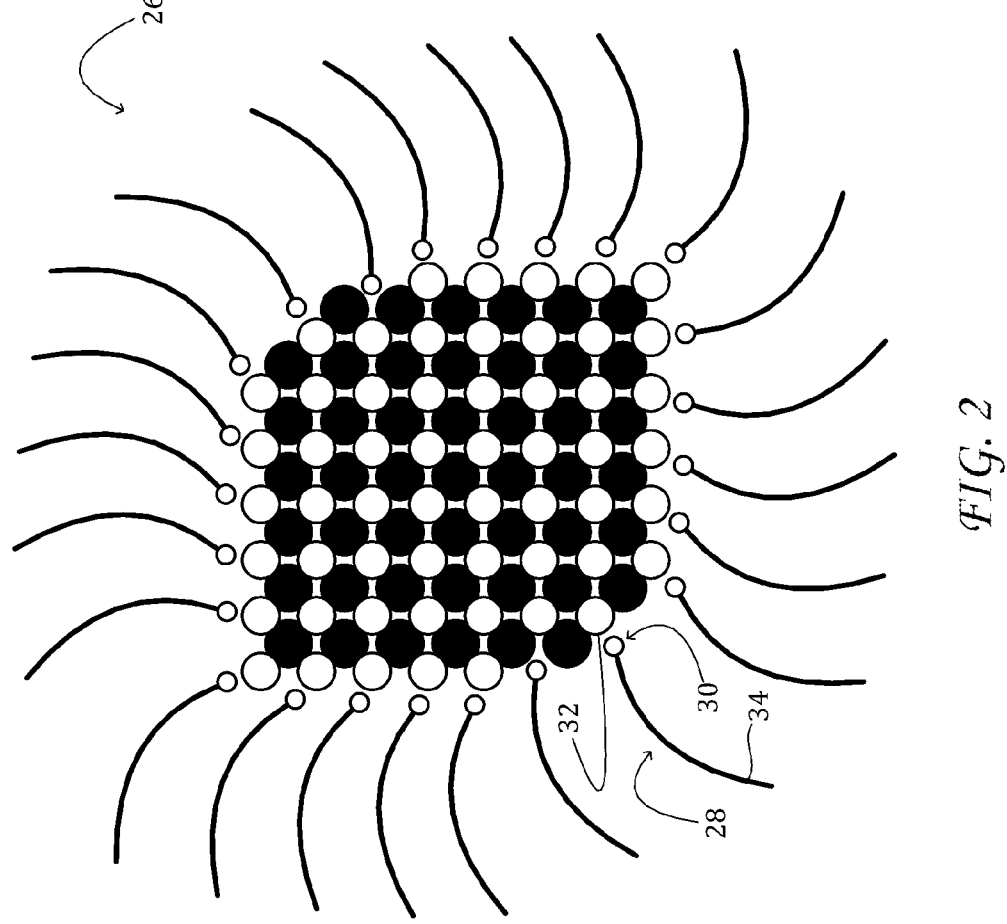
FIG. 2 schematically illustrates the coordination environment of an example semiconductor nanoparticle.

The inventors herein have explored the above issues and have achieved high loadings of certain semiconductor nanoparticles (quantum-dot) by selection of the liquid matrix in view of the coordination environment of the nanoparticles. Suitable liquid matrices include curable liquids (resin) that give rise to polymerized substrate coatings, in addition to volatile solvents that, upon evaporation, leave behind close-packed quantum-dot ensembles. The concentrated liquids described herein are amenable to a broad range of application techniques, to yield a broad range of manufactured products.

Other examples herein relate to a ink composition comprising a volatile solvent and a plurality of semiconductor nanoparticles. Each semiconductor nanoparticle is coordinated to a plurality of organic ligands and dispersed in the volatile solvent. In these examples, the ratio by mass of the semiconductor nanoparticles to the volatile solvent is greater than 1:1. That is, the mass content of the semiconductor nanoparticles in the ink composition is larger than 50% by mass.

Still other examples herein relate to a product comprising a solid substrate and, arranged on the solid substrate, a dried residue of a ink composition comprising a plurality of semiconductor nanoparticles each coordinated to a plurality of organic ligands.

Some of the examples herein relate to a liquid resin composition comprising a thermally polymerizable resin and a plurality of quantum-dot semiconductor nanoparticles. Each semiconductor nanoparticle is coordinated to a plurality of organic ligands and dispersed in the thermally polymerizable resin. In these examples, the ratio by mass of the semiconductor nanoparticles to the thermally polymerizable resin is greater than 1:1. That is, the mass content of the semiconductor nanoparticles in the liquid resin composition is larger than 50% by mass.

Other examples herein relate to a produced matter comprising a solid substrate, a thermally polymerized matrix arranged on the solid substrate, and a plurality of quantum-dot semiconductor nanoparticles. Each semiconductor nanoparticle is coordinated to a plurality of organic ligands and dispersed in the thermally polymerized matrix. In these examples, the ratio by mass of the semiconductor nanoparticles to the thermally polymerized matrix is greater than 1:1. That is, the mass content of the semiconductor nanoparticles in the produced matter is larger than 50% by mass.

The Summary above is provided in order to introduce in simplified form a selection of concepts that are further described in the Detailed Description. The Summary is not intended to identify key features or essential features of the claimed subject matter, nor is it intended to be used to limit the scope of the claimed subject matter.

The balance of this disclosure will now be presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example product in the form of a color-display structure 10. The color-display structure 10 includes an excitation light-emitting layer 12 and a fluorescent layer 14. The excitation light-emitting layer 12 is configured to emit relatively short-wavelength excitation-blue light of about 450 nanometers (nm), in some examples, and/or ultraviolet light in others. The fluorescent layer 14 is configured to receive the excitation from the excitation light-emitting layer 12 and to emit a corresponding fluorescence. In FIG. 1, excitation light-emitting layer 12 forms an inner layer of a regular array 16 of light-emitting elements 18, and fluorescent layer 14 forms an outer layer of the array 16 of light-emitting elements 18. Example excitation light-emitting elements for the excitation light-emitting layer 12 include light-emitting diodes (LEDs) and organic light-emitting diodes (OLEDs), among others. In alternative implementations, excitation light-emitting layer 12 and fluorescent layer 14 may belong to separate structures, with the fluorescent layer 14 arranged optically downstream of the excitation light-emitting layer 12. In these and other examples, fluorescent layer 14 includes a substantially transparent, solid substrate 20 capable of supporting a film of any suitable thickness. The substrate 20 may comprise acrylic, polycarbonate, glass, or quartz, for instance.

The topology of substrate 20 is not particularly limited. In examples in which fluorescent layer 14 is an outer layer of the array 16 of light-emitting elements 18, substrate 20 may be segmented in registry with individual light-emitting elements 18 or rows of light-emitting elements 18. In other examples, the topology of the substrate 20 may be relatively featureless and/or continuous.

Irrespective of the topology of the substrate 20, fluorescent layer 14 comprises, as shown in FIG. 1, a regular array of pixel elements (i.e., red pixel elements 22R each including a red-emissive film 24R arranged on substrate 20, green pixel elements 22G each including a green-emissive film 24G arranged on substrate 20, and blue pixel elements 22B). The red-emissive film is configured to absorb blue excitation received thereon and emit red fluorescence of about 680 nm. Likewise, the green-emissive film is configured to absorb the blue excitation and emit green fluorescence of about 520 nm. In the illustrated example, blue pixel elements 22B merely transmit the blue excitation received thereon. In another example, the excitation light-emitting layer may be configured to emit ultraviolet (UV) rather than blue excitation. In that example, the red- and green-emissive films 24R and 24G may be configured to fluoresce pursuant to the UV excitation, and each blue pixel element 22B may comprise a blue-emissive film arranged on the substrate. The blue-emissive film may be configured to absorb the UV excitation received thereon and emit blue fluorescence of about 450 nm. In general, it is desirable for each photoemissive film 24 (embodied as red-emissive film 24R, green-emissive film 24G, and the analogous blue-emissive film, where appropriate) to collectively absorb substantially all of the excitation light received thereon, such that the fluorescence emitted from the photoemissive film is substantially free from excitation light impurity. Accordingly, it is desirable for each photoemissive film to have a high absorbance value (e.g., a value of 2 or greater in some examples) and a correspondingly high luminophore concentration.

Each photoemissive film 24 in FIG. 1 comprises a dispersion of semiconductor nanoparticles (quantum-dots), which function as luminophores. Various semiconductor-nanoparticle compositions are envisaged herein. In some examples, the semiconductor nanoparticles may comprise a III,V semiconductor such as indium phosphide (InP). In some examples, the semiconductor nanoparticles may comprise copper selenide ($Cu_xS$) or other semiconductors. The emission spectrum of a semiconductor-nanoparticle dispersion is a function of the distribution of crystallite dimensions of the nanoparticles in the dispersion. For a given semiconductor composition, larger crystallites emit at longer wavelengths, as shown by example in the table below.

Table 1 shows the wavelength of emission maximum ($\lambda_{max}$) versus crystallite size for example InP nanoparticles.

TABLE 1

| mean crystallite diameter/nm | $\lambda_{max}$/nm |
|---|---|
| 2 | 470 |
| 3 | 520 |
| 4 | 620 |

FIG. 2 schematically illustrates an example coordination environment of a semiconductor nanoparticle 26 of photoemissive film 24. As shown in the drawing, the semiconductor nanoparticle 26 is coordinated to a plurality of organic ligands 28. Each organic ligand 28 includes a functional head group 30 having an affinity for at least one lattice atom 32 of the semiconductor nanoparticle 26. Suitable head groups 30 include thiol, carboxylic acid, and amine (e.g., primary amine) head groups in some examples. Each organic ligand 28 also includes a tail portion 34 that extends away from semiconductor nanoparticle 26 and into the surrounding matrix. The organic ligand 28 is used during semiconductor nanoparticle synthesis (vide infra) to stabilize and solubilize the growing semiconductor nanoparticle. After isolation of the semiconductor-nanoparticle material, the ligand shell provides a kinetic barrier against agglomeration, Ostwald ripening, and various other degradation processes. In some examples, the stability of the ligand shell is enhanced by intermolecular (e.g., van der Waals) interactions among adjacent ligand molecules. Such intermolecular interactions are believed to be significant for organic ligands having an aliphatic tail of six or more carbon atoms, six to twelve carbon atoms, or twelve or more carbon atoms. Accordingly, the plurality of organic ligands 28 may include aliphatic thiol, carboxylic acid, or amine ligands of chain lengths in these ranges. In more particular examples, the plurality of organic ligands may include dodecanethiol, oleic acid, or oleylamine. The organic ligand may, in some examples, bind exchangeably to the semiconductor nanoparticle product, such that a ligand molecule with greater affinity for the semiconductor nanoparticle product may displace any, some, or all of the organic ligands incorporated during synthesis. The ligand-exchange strategy may be used to prepare nanoparticle structures for various applications.

FIG. 3 shows aspects of an example method 36 to synthesize a semiconductor-nanoparticle material. The method may be enacted using batch or continuous-flow (e.g., segmented continuous-flow) processing.

At 38 of method 36, a first precursor is formed as a solution or suspension of a suitable first starting material. The first precursor may be formed by combining the first starting material, an organic ligand, and, optionally, a solvent. The first starting material may be a simple or complex salt of a metallic element of the desired semiconductor-nanoparticle material—a salt of monovalent copper or trivalent indium, for example. In more particular examples, the first starting material may include substantially anhydrous copper(I) chloride or indium(III) chloride. The organic ligand may be an organic compound capable of coordinating monovalent copper or trivalent indium to form a soluble complex ion. The organic ligand may also be capable of binding to the exterior of the semiconductor-nanoparticle product of method 36, thereby encapsulating (encapsulation) each semiconductor nanoparticle in an organized lipid layer, as noted above. In some examples, the organic ligand may include dodecanethiol. Further, in some examples, the organic ligand may include oleylamine.

The solvent, when included, may comprise any relatively high-boiling solvent (b.p.>250° C.) capable of dissolving lipophilic semiconductor nanoparticles. Examples include nonpolar solvents and solvents of relatively low polarity, such as hydrocarbons. The solvent may comprise 1-octadecene in some examples. In some examples, the first precursor may be deoxygenated by sparging with a non-reactive gas, such as nitrogen, argon, or helium.

At 40 of method 36, a second precursor is formed as a solution or suspension of a suitable second starting material. The second precursor may be formed by combining the second starting material, a solvent, and, optionally, an organic ligand. The second starting material may include a non-metallic or metalloid element of the desired semiconductor-nanoparticle material. In examples in which the first starting material is a salt of monovalent copper, the second starting material may include elemental selenium, such as elemental black selenium. In examples in which the first starting material is a salt of trivalent indium, the second starting material may include an organophosphine. The solvent and/or organic ligand components of the second precursor may be the same or different those that of the first precursor. In some examples, the second precursor may be deoxygenated by sparging with a non-reactive gas, such as nitrogen, argon, or helium.

At 42 of method 36, a flowable reaction mixture is formed by combining the first precursor and the second precursor. At 44 the flowable reaction mixture is conducted through one or more heating units. In some examples, the flowable reaction mixture may be conducted through a microwave heating unit. In these and other examples, the flowable reaction mixture may be conducted through a flow heater maintained at a temperature within a range of 220 to 300° C.

At 46 of method 36, the flowable reaction mixture is combined with an excess amount of a higher-polarity solvent in order to precipitate the semiconductor-nanoparticle material, which then may be collected. In some examples, the higher-polarity solvent may include absolute ethanol, which is freely miscible with 1-octadecene and with other solvents that readily dissolve ligand-encapsulated semiconductor nanoparticles. Other higher-polarity solvents are also envisaged.

No aspect of the above method should be understood in a limiting sense, because numerous variations and extensions are also envisaged. In some examples, relatively small semiconductor nanoparticles, such as blue- and/or green-emitting InP semiconductor nanoparticles are synthesized in a continuous-flow process, as described above. When red-emitting InP semiconductor nanoparticles are desired, a portion of the blue- and or green-emitting material may be subjected to additional processing under conditions that favor controlled semiconductor nanoparticle growth over nucleation. In some examples, semiconductor nanoparticles formed according to method 36 may serve as cores supporting one or more shells of different semiconductor composition. An InP core may support a zinc selenide (ZnSe) and/or a zinc sulfide (ZnS) shell, for instance. A shell may be grown on a core by subjecting the core to reaction conditions analogous to the conditions used in method 36, using suitable precursors. In still other examples, the desired semiconductor-nanoparticle product may be synthesized from suitable precursors in any suitable batch process.

In some examples, photoemissive film 24 of FIG. 1 may comprise a thermally polymerized matrix and, dispersed within the thermally polymerized matrix, a plurality of semiconductor nanoparticles each coordinated to a plurality of organic ligands. The ratio by mass of the semiconductor nanoparticles to the thermally polymerized matrix may be greater than 1:1. In more particular examples, the ratio by mass of the semiconductor nanoparticles to the thermally polymerized matrix may be between 2:1 and 4:1. In some examples, the thermally polymerized matrix may include an acrylate polymer. In a more particular example, the thermally polymerized matrix may include isobornyl acrylate polymer. When a ratio by mass of semiconductor nanoparticles to one or more other materials is expressed in this disclosure, it will be understood that the mass of the semiconductor nanoparticles includes the mass of any organic ligand that may be coordinated to the semiconductor.

FIG. 4 shows aspects of an example method 48 to manufacture a produced matter. At 50 of method 48 a liquid resin composition is prepared. The liquid resin composition includes a thermally polymerizable resin and, dispersed in the thermally polymerizable resin, a plurality of semiconductor nanoparticles each coordinated to a plurality of organic ligands. The ratio by mass of the semiconductor nanoparticles to the thermally polymerizable resin may be greater than 1:1. In more particular examples, the ratio by mass of the semiconductor nanoparticles to the thermally polymerizable resin may be between 2:1 and 4:1. In some examples, the liquid resin composition may fully dissolve the semiconductor nanoparticles at the indicated ratios, forming a concentrated solution. The term 'resin' refers herein to a substance, natural or synthetic, that is capable of undergoing polymerization or further polymerization to form a polymer.

Preparation of the liquid resin composition may begin, at 36 of method 48, with synthesis of semiconductor-nanoparticle material, as illustrated in FIG. 3. At 52 of method 48 the semiconductor-nanoparticle material is combined with a thermally polymerizable resin at the desired ratio. In some examples, the thermally polymerizable resin includes an acrylate monomer. In a more particular example, the thermally polymerizable resin may include a monoacrylate monomer. In a still more particular example, the thermally polymerizable resin may include isobornyl acrylate (IBOA). Isobornyl acrylate (IBOA) has been often used as a photocurable resin in the past, but in the present invention, isobornyl acrylate (IBOA) can be used as a heat-curable resin. As thermal curing is envisaged herein, the liquid resin composition need not include any added photoinitiator. In examples in which the semiconductor-nanoparticle material from method 36 entrains a solvent used in nanoparticle synthesis, that solvent, at 54, may be removed by evaporation at reduced pressure and/or elevated temperature. In other examples, such as when the semiconductor-nanoparticle material is provided without entrained solvent, step 54 may be omitted.

Although various thermally polymerizable resins (monomers) are envisaged herein, it will be noted that few of the thermally polymerizable resins (monomers) investigated were capable of dissolving an equivalent mass of InP semiconductor nanoparticles. Thermally polymerizable resins (monomers) that became saturated at InP semiconductor-nanoparticle ratios lower than 1:1 include: 1,6-hexanediol diacrylate (HDDA) and 2-(2-ethoxyethoxy)ethyl acrylate.

At 56 the mixture of semiconductor nanoparticles and thermally polymerizable resin is homogenized. In some examples, the mixture may be homogenized under ultrasound. An ultrasonic bath, horn, or probe may be used, for example. In some examples, the resulting dispersions are stable for an extended shelf life. The shelf life may comprise weeks or months, in some instances. For some semiconductor-nanoparticle compositions and particle sizes, shorter and longer shelf lives may be observed.

At 58A of method 48, the liquid resin composition is applied to a substrate of the produced matter to be manufactured. At 60 of method 48, the liquid resin composition is cured thermally to form a semiconductor-nanoparticle film. Thermal curing may comprise heating the film of the liquid resin composition or the substrate to which the liquid resin composition is applied. In some examples, a curing temperature of about 100° C. may be used, but other temperatures may also be used. At 61 of method 48, in some examples the semiconductor-nanoparticle film so formed is subject to heat treatment to further densify the film. In one example, the semiconductor-nanoparticle film may be heated for 30 minutes in air at 100° C., although some thinner depositions may be thermally processed within 5 to 10 minutes at 100° C. Other heat-treatment conditions are also envisaged. In some examples, heat-treatment may be omitted.

In other examples, photoemissive film 24 of FIG. 1 may comprise a dried residue of an ink composition, wherein the ink composition comprises a plurality of semiconductor nanoparticles each coordinated to a plurality of organic ligands and dispersed in a volatile solvent. In some examples, the dried residue comprises a dense arrangement of the plurality of semiconductor nanoparticles, with no intervening matrix material or other materials other than the organic ligands surrounding the semiconductor nanoparticles. In some examples, the dried residue includes a trace amount of the volatile solvent. Here, the fact that the dried residue includes a trace amount of volatile solvent means that the proportion of the volatile solvent contained in the product obtained as the dried residue is 1.0% by mass or less. In some examples, the plurality of semiconductor nanoparticles of the dried residue includes a close-packed layer of the semiconductor nanoparticles. It will be understood that the term 'volatile' applies herein to a solvent having a significant vapor pressure (e.g., greater than 40 kPa) at temperatures in the range of 80 to 150° C., where the ink composition is to be dried.

FIG. 5 shows aspects of another example method 62 to manufacture a product. At 64 of method 62 an ink composition is prepared. The ink composition includes a volatile solvent and, dispersed in the volatile solvent, a plurality of semiconductor nanoparticles each coordinated to a plurality of organic ligands, and the ratio by mass of the semiconductor nanoparticles to the volatile solvent may be greater than 1:1. In more particular examples, the ratio by mass of the semiconductor nanoparticles to the volatile solvent may be between 2:1 and 4:1. In some examples, the volatile solvent may fully dissolve the semiconductor nanoparticles at the indicated ratios, forming a concentrated solution. The ink composition substantially does not include a matrix material or other material other than the organic ligand surrounding the semiconductor nanoparticles.

Preparation of the ink composition may begin, at 36 of method 62, with synthesis of semiconductor-nanoparticle material, as illustrated in FIG. 3. At 66 of method 62 the semiconductor-nanoparticle material is combined with a volatile solvent at the desired ratio. In some examples, the volatile solvent includes a monocyclic terpenoid. In some further examples, the volatile solvent includes a solvent which is a monocyclic terpenoid and is an alcohol. In more particular examples, the volatile solvent may include terpineol, dihydroterpineol (DHT) and/or dihydroterpineol acetate (DHTA). In some examples, the volatile solvent may be a mixture of two or more pure substances, such as DHT and n-octynol. Although various volatile solvents and volatile solvent mixtures are envisaged herein, it will be noted that few of the volatile solvents investigated were capable of dissolving an equivalent mass of InP semiconductor nanoparticles. Solvents that became saturated at InP semiconductor-nanoparticles ratios lower than 1:1 include 1-hexanol.

In examples in which the semiconductor-nanoparticle material from method 36 entrains a solvent used in nanoparticle synthesis, that solvent, at 68, may be removed by evaporation at reduced pressure and/or elevated temperature. In other examples, such as when the semiconductor-nanoparticle material is provided without entrained solvent, step 68 may be omitted. At 70 of method 62, the mixture of semiconductor nanoparticles and volatile solvent is homogenized. In some examples, the mixture may be homogenized under ultrasound. An ultrasonic bath, horn, or probe may be used, for example.

At 58B of method 62, the ink composition is applied to a substrate of the product, as described hereinafter. At 72 of method 62, the ink composition is dried to form a semiconductor-nanoparticle film. Drying may comprise exposing the ink composition to a current of air, to a current of dry air, to a current of dry nitrogen, or to a current of dry, heated air or nitrogen, for example. At 61 of method 62, the semiconductor-nanoparticle film so formed is subject to heat treatment to further densify the film. In one example, the semiconductor-nanoparticle film may be heated for 30 minutes in air at 100° C., although some thinner depositions may be thermally processed within 5 to 10 minutes at 100° C. Other heat-treatment conditions are also envisaged.

At 58A and 58B of the above methods 48 and 62, the method of applying the liquid resin composition or the ink composition to the substrate is not particularly limited. The liquid resin composition or ink composition may be applied via inkjet printing (e.g., piezoelectric inkjet printing), aerosol-jet printing, spray coating, or doctor-blade application, for example. It has been observed that use of semiconductor-nanoparticle solutions that are below saturation provide smoother films and extended nozzle lifetime in ink-jet implementations. In general, by applying inks and liquid resin composition of relatively high semiconductor-nanoparticle concentration, the number and/or thickness of applications required to achieve a given semiconductor-nanoparticle coverage may be reduced. In some examples, the higher concentrations may enable one-pass printing, which relaxes any need for precise pattern registration between applications. Furthermore, reduced application thickness may discourage the spreading of the liquid among adjacent pixels (or other printed features) of a color-display structure. This may facilitate the printing of patterns having desirably small pixel pitch. Further still, single-pass printing may reduce print-job completion cycle time relative to multi-pass printing. Production throughput may therefore increase. In some examples, semiconductor-nanoparticle film thickness in the range of 30 to 35 μm are obtained in one application pass.

The ink composition according to the embodiment of the present invention includes the following configurations.

(1) An ink composition, comprising:

a volatile solvent; and dispersed in the volatile solvent, a plurality of semiconductor nanoparticles each coordinated to a plurality of organic ligands, wherein a ratio by mass of the semiconductor nanoparticles to the volatile solvent is greater than 1:1.

(2) The ink composition as described in (1) hereinabove, wherein the volatile solvent includes a solvent which is a monocyclic terpenoid.

(3) The ink composition as described in (1) hereinabove, wherein the volatile solvent includes a solvent which is a monocyclic terpenoid and is an alcohol.

(4) The ink composition as described in any one of (1) to (3) hereinabove, wherein the volatile solvent includes one or more of dihydroterpineol, terpineol, and dihydroterpineol acetate.

(5) The ink composition as described in any one of (1) to (4) hereinabove, wherein the plurality of organic ligands includes an aliphatic thiol, carboxylic acid, or amine.

(6) The ink composition as described in any one of (1) to (5) hereinabove, wherein the plurality of organic ligands includes dodecanethiol.

(7) The ink composition as described in any one of (1) to (6) hereinabove, wherein the ratio by mass of the semiconductor nanoparticles to the volatile solvent is between 2:1 and 4:1.

(8) The ink composition as described in any one of (1) to (7) hereinabove, wherein the ink composition substantially does not include a matrix material or other material other than the organic ligand surrounding the semiconductor nanoparticles.

The product according to the embodiment of the present invention includes the following configurations.

(9) A product comprising:

a solid substrate; and arranged on the solid substrate, a dried residue of an ink composition, the dried residue comprising a plurality of semiconductor nanoparticles arranged without an intervening polymer matrix, wherein the a plurality of semiconductor nanoparticles each coordinated to a plurality of organic ligands.

(10) The product as described in (9) hereinabove, wherein the plurality of semiconductor nanoparticles of the dried residue includes a close-packed layer of the semiconductor nanoparticles.

(11) The product as described in (9) or (10) hereinabove, wherein the dried residue consists substantially of the plurality of semiconductor nanoparticles.

(12) The product as described in (11) hereinabove, wherein the dried residue includes a trace amount of the volatile solvent.

(13) The product as described in any one of (9) to (12) hereinabove, wherein the plurality of organic ligands includes an aliphatic thiol, carboxylic acid, or amine.

(14) The product as described in any one of (9) to (13) hereinabove, wherein the plurality of organic ligands includes dodecanethiol.

(15) The product as described in any one of (9) to (14) hereinabove, wherein the solid substrate comprises a substantially transparent substrate.

The liquid resin composition according to the embodiment of the present invention includes the following configurations.

(16) A liquid resin composition comprising:

a thermally polymerizable resin; and dispersed in the thermally polymerizable resin, a plurality of semiconductor nanoparticles each coordinated to a plurality of organic ligands, wherein a ratio by mass of the semiconductor nanoparticles to the thermally polymerizable resin is greater than 1:1.

(17) The liquid resin composition as described in (16) hereinabove, wherein the thermally polymerizable resin includes an acrylate monomer.

(18) The liquid resin composition as described in (16) or (17) hereinabove, wherein the thermally polymerizable resin includes isobornyl acrylate.

(19) The liquid resin composition as described in any one of (16) to (18) hereinabove, wherein the plurality of organic ligands includes an aliphatic thiol, carboxylic acid, or amine.

(20) The liquid resin composition as described in any one of (16) to (19) hereinabove, wherein the plurality of organic ligands includes dodecanethiol.

(21) The liquid resin composition as described in any one of (16) to (20) hereinabove, wherein the ratio by mass of the semiconductor nanoparticles to the thermally polymerizable resin is between 2:1 and 4:1.

The produced matte according to the embodiment of the present invention includes the following configurations.

(22) A produced matter comprising:

a solid substrate;

a thermally polymerized matrix arranged on the solid substrate; and dispersed within the thermally polymerized matrix, a plurality of semiconductor nanoparticles each coordinated to a plurality of organic ligands, wherein a ratio by mass of the semiconductor nanoparticles to the thermally polymerized matrix is greater than 1:1.

(23) The produced matter as described in (22) hereinabove, wherein the thermally polymerized matrix includes an acrylate polymer.

(24) The produced matter as described in (22) or (23) hereinabove, wherein the thermally polymerized matrix includes isobornyl acrylate polymer.

(25) The produced matter as described in any one of (22) to (24) hereinabove, wherein the plurality of organic ligands includes an aliphatic thiol or amine.

(26) The produced matter as described in any one of (22) to (25) hereinabove, wherein the plurality of organic ligands includes dodecanethiol.

(27) The produced matter as described in any one of (22) to (26) hereinabove, wherein the ratio by mass of the semiconductor nanoparticles to the thermally polymerized matrix is between 2:1 and 4:1.

(28) The produced matter as described in any one of (22) to (27) hereinabove, wherein the solid substrate comprises a substantially transparent substrate.

No aspect of any of the above drawings or description should be understood in a limiting sense, because numerous variations, extensions, and omissions are equally envisaged. Although the above examples relate to down-converting fluorescent films for display products, the same methodologies are applicable to creating quantum-dot films for electroluminescent devices.

It will be understood that the configurations and methods described herein are provided by way of example, and that these examples are not to be considered in a limiting sense because numerous variations, extensions, and omissions are also envisaged. Any of the various acts of an above method may be performed in the sequence illustrated, in other sequences, in parallel, or omitted.

The subject matter of the present disclosure includes all novel and non-obvious combinations and sub-combinations of the various configurations, methods, properties, and other features disclosed herein, as well as any and all equivalents thereof.

EXAMPLES (Preparation of Semiconductor Nanoparticles)

Indium acetate (48 mmol), zinc oleate (101 mmol), oleic acid (130 mmol), 1-dodecanethiol (14.4 mmol), and 1-octadecene (1.6 L) were placed in a tank for the precursor. Then, the mixture was stirred while being evacuated with a vacuum pump, heated to 110° C., and reacted for 20 hours. Then, the mixture was cooled to 25° C. in an atmosphere in which 1 atm of nitrogen gas was introduced from the nitrogen gas source to obtain an In precursor. Then, tristrimethylsilylphosphine (32 mmol) as a P precursor was added to the mixture, and the mixture was sufficiently stirred to prepare a flowable reaction mixture containing an In precursor and a P precursor as a raw material for particle formation.

Next, the flowable reaction mixture prepared as described above was sent to a continuous-flow type particle production device. Further, by introducing nitrogen gas into the flowable reaction mixture as the gas for segmentation, the flow of the segmented flowable reaction mixture is obtained, and the flow of the segmented flowable reaction mixture was heated at a temperature of 300° C. by a flow heater. By heating the flow of the flowable reaction mixture, a reaction took place in the flowable reaction mixture, resulting in a flow of product particle containing InP semiconductor nanoparticles. Gas-liquid separation of the flow of the obtained product particle was performed, and the gas for segmentation was separated to obtain a dispersion liquid containing InP semiconductor nanoparticles.

1-Dodecanethiol (28.8 mmol) was further added to the dispersion liquid containing the obtained InP semiconductor nanoparticles, and the mixture was stirred for 1 hour.

Then, acetone was added and mixed well, and then centrifugation was performed with a centrifugal acceleration of 4000G. The precipitate was collected and normal hexane was added to the precipitate to prepare a dispersion. This operation was repeated several times to obtain InP semiconductor nanoparticles encapsulated in dodecanethiol.

[Example 1] to [Example 4], [Comparative Example 1] to [Comparative Example 6]

(Preparation of Liquid Resin Composition/Ink Composition)

The liquid resin composition and the ink composition were prepared using the InP semiconductor nanoparticles encapsulated in dodecanethiol obtained as described above.

The thermally polymerizable resin (monomer) or volatile solvent shown in Tables 2 and 3 was added to the InP semiconductor nanoparticles encapsulated in dodecanethiol, and the semiconductor nanoparticles were dispersed using an ultrasonic horn.

Here, in the degree of dispersion of semiconductor nanoparticles shown in Tables 2 and 3, in the liquid resin composition and the ink composition, "A" is given to those in which semiconductor nanoparticles were dispersed in a mass ratio of "semiconductor nanoparticles" to "thermally polymerizable resin or volatile solvent" in a range greater than 1:1, "B" to those in which they were dispersed in a ratio in a range less than 1:1, "C" to those in which they were not dispersed at all.

TABLE 2

|  | thermally polymerizable resin (monomer) | monomer type | degree of dispersion of semiconductor nanoparticles |
|---|---|---|---|
| Example 1 | isobornyl acrylate | acrylic monomer | A |
| Comparative Example 1 | 1,6-hexanediol diacrylate (HDDA) | acrylic monomer | B |
| Comparative Example 2 | 2-(2-ethoxyethoxy)ethyl acrylate | acrylic monomer | B |

TABLE 3

| | volatile solvent | mono-cyclic terpenoid | alcohol | degree of dispersion of semiconductor nanoparticles |
|---|---|---|---|---|
| Example 2 | dihydroterpineol (DHT) | Y | Y | A |
| Example 3 | terpineol | Y | Y | A |
| Example 4 | dihydroterpineol acetate (DHTA) | Y | | A |
| Comparative Example 3 | 1-hexanol | | Y | B |
| Comparative Example 4 | 1-methyl-2-pyrrol-idone | | | C |
| Comparative Example 5 | oleylamine | | | C |
| Comparative Example 6 | diisononyl phthalate | | | C |

[Experimental Example 1-2], [Experimental Example 1-3], [Example 1-4], [Example 1-5]

(Measurement of Viscosity of Composition)

Regarding the liquid resin composition prepared in Example 1, the mass % of the semiconductor nanoparticles in the liquid resin composition was changed from 30% by mass to 90% by mass to prepare the liquid resin composition, and the viscosity of each was measured at 21° C. The results are shown in Table 4.

TABLE 4

| | mass ratio of semiconductor nanoparticles (mass %) | viscosity (cP) |
|---|---|---|
| Experimental Example 1-2 | 30 | 9 |
| Experimental Example 1-3 | 50 | 29 |
| Example 1-4 | 80 | 7644 |
| Example 1-5 | 90 | — |

Since the semiconductor nanoparticles were not completely dispersed in the liquid resin composition in which the mass % of the semiconductor nanoparticles was 90% by mass, the viscosity was not measured. The liquid resin composition in which the mass % of the semiconductor nanoparticles was 30% by mass to 80% by mass had a viscosity that could be used by inkjet.

[Experimental Example 2-2], [Experimental Example 2-3], [Example 2-4], [Example 2-5]

Regarding the ink composition prepared in Example 2, the mass % of the semiconductor nanoparticles in the ink composition was changed from 30% by mass to 90% by mass to prepare the ink composition, and the viscosity of each was measured at 21° C. The results are shown in Table 5.

TABLE 5

| | mass of solid content (%) | viscosity (cP) |
|---|---|---|
| Experimental Example 2-2 | 30 | 46 |
| Experimental Example 2-3 | 50 | 198 |
| Example 2-4 | 80 | 6755 |
| Example 2-5 | 90 | — |

Since the semiconductor nanoparticles were not completely dispersed in the ink composition in which the mass % of the semiconductor nanoparticles was 90% by mass, the viscosity was not measured. The ink composition in which the mass % of the semiconductor nanoparticles was 30% by mass to 80% by mass had a viscosity that could be used by inkjet.

(Preparation of Film)

A film was prepared using the resin composition of Experimental Example 1-3 and the ink composition of Experimental Example 2-3.

These resin compositions and ink compositions were applied on a glass substrate in a single pass using an inkjet nozzle (500 Hz), and heat-treated at 100° C. for 30 minutes.

Figure 6:
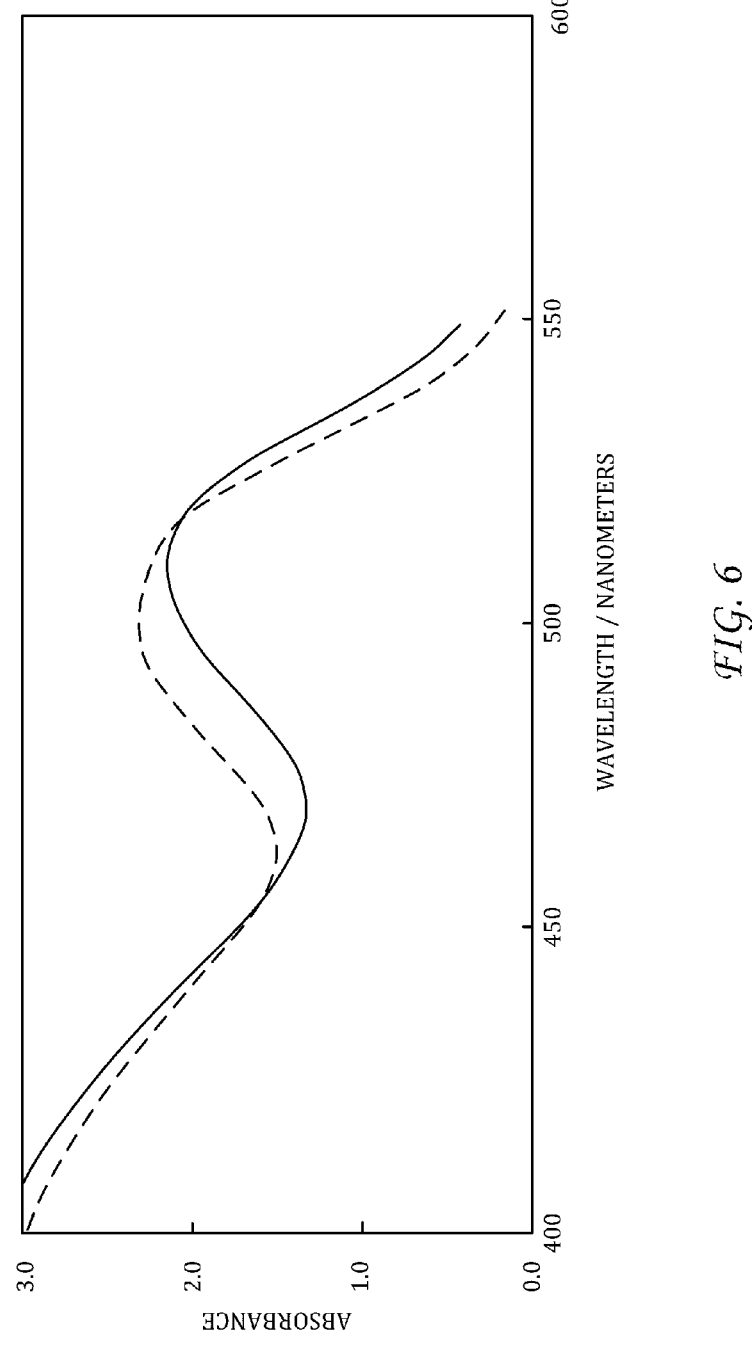
FIG. 6 shows an overlay of absorption spectra of two different semiconductor-nanoparticle films in a thickness range of 30 to 35 micrometers ($\mu$m).

FIG. 6 shows an overlay of absorption spectra of two different semiconductor-nanoparticle films. The solid line is an absorption spectrum of a 35 μm film of InP semiconductor nanoparticles immobilized in thermally polymerized IBOA polymer. This film exhibits an absorbance maximum of 2.14 at a $\lambda_{max}$ of 510 nm. The dashed line is an absorption spectrum of a 30 μm film of InP semiconductor nanoparticles as a dried residue of a DHT-based ink composition. This film exhibits an absorbance maximum of 2.31 at a $\lambda_{max}$ of 498 nm.

Figure 7:
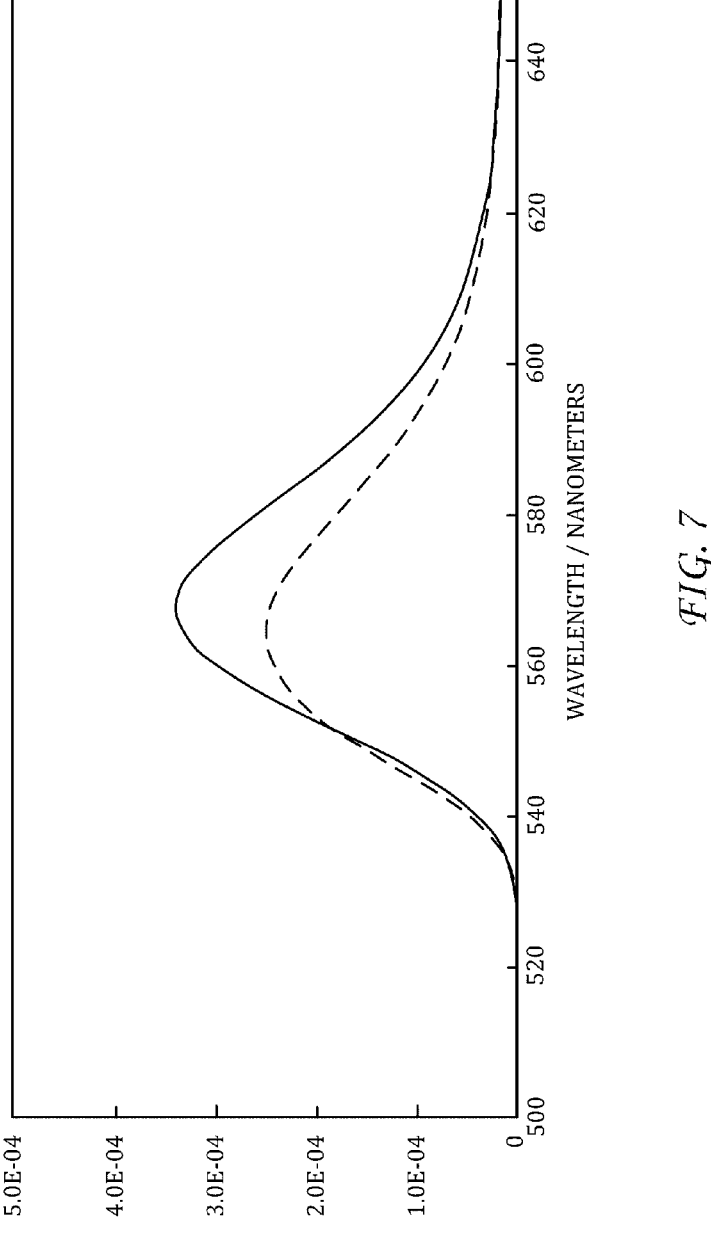
FIG. 7 shows an overlay of emission spectra of two different semiconductor-nanoparticle films in a thickness range of 30 to 35 $\mu$m.

FIG. 7 shows an overlay of emission spectra of two different semiconductor-nanoparticle films. The solid line is an emission spectrum of a 35 μm film of InP semiconductor nanoparticles immobilized in thermally polymerized IBOA polymer. With 450 nm excitation, this film exhibits an emission maximum of 3.41E-04 relative fluorescence units (RFU) at a $\lambda_{max}$ of 568 nm. The dashed line is an emission spectrum of a 30 μm film of InP semiconductor nanoparticles as a dried residue of a DHT-based ink composition. With 450 nm excitation, this film exhibits an emission maximum of 2.50E-04 RFU at a $\lambda_{max}$ of 498 nm.

Figure 8:
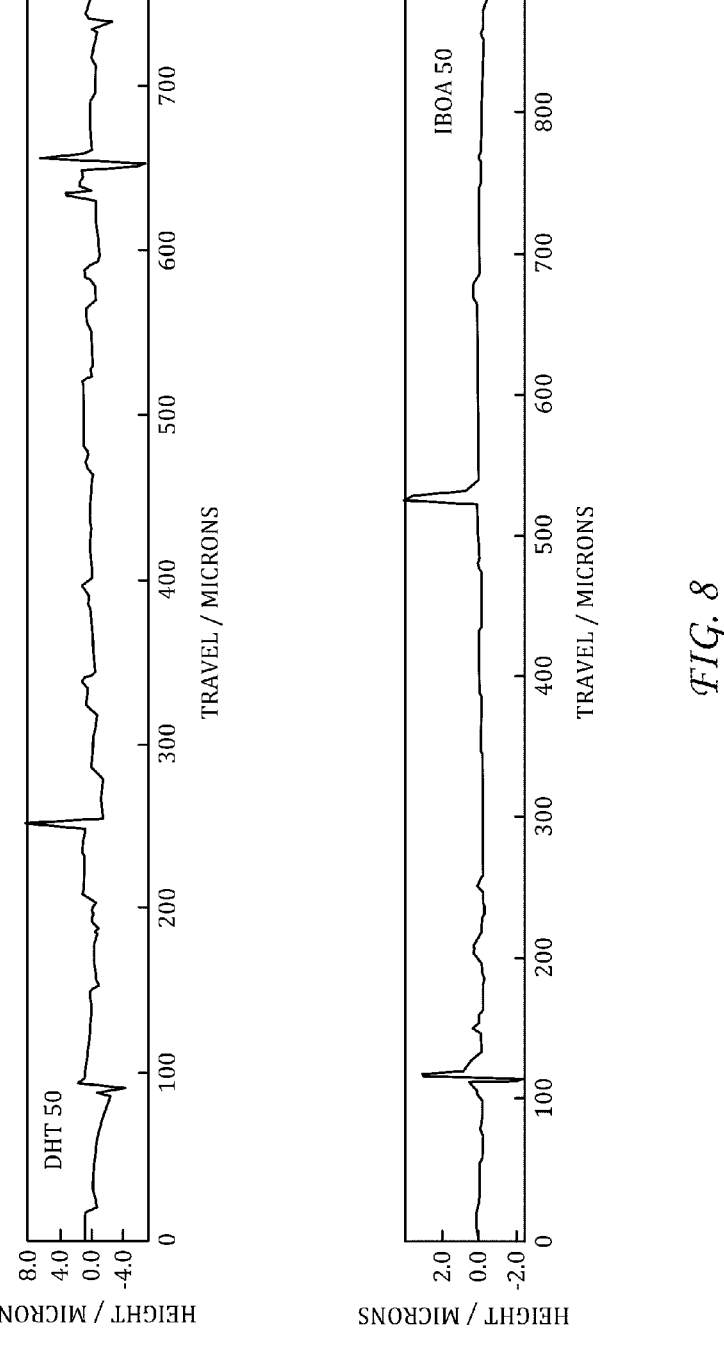
FIG. 8 shows profilometer scans of two different semiconductor-nanoparticle films in a thickness range of 30 to 35 $\mu$m.

FIG. 8 shows profilometer scans of two different semiconductor-nanoparticle films. The lower panel represents a scan of a 35-μm film of InP semiconductor nanoparticles immobilized in thermally polymerized IBOA polymer. The upper panel represents a scan of a 30-μm film of InP semiconductor nanoparticles as a dried residue of a DHT-based ink composition. Each scans demonstrates that the associated film-preparation method results in a desirably smooth film.

REFERENCES CHARACTERS LIST 10 color-display structure
12 excitation light-emitting layer
14 fluorescent layer
16 array
18 light-emitting elements
20 substrate
22B blue pixel element
22G green pixel element
22R red pixel element
24 photoemissive film
24B blue-emissive film
24G green-emissive film 24R red-emissive film 26 semiconductor nanoparticle 28 organic ligand 30 head group 32 lattice atom 34 tail portion 36 example method to synthesize a semiconductor-nanoparticle material 48 example method to manufacture a produced matter 62 another example method to manufacture a product

The invention claimed is:

1. An ink composition, comprising:

a volatile solvent; and dispersed in the volatile solvent, a plurality of semiconductor nanoparticles each coordinated to a plurality of organic ligands, wherein a ratio by mass of the semiconductor nanoparticles to the volatile solvent is greater than 1:1, and wherein the volatile solvent includes a solvent which is a monocyclic terpenoid.

2. The ink composition according to claim 1, wherein the solvent which is the monocyclic terpenoid is an alcohol.

3. The ink composition according to claim 1, wherein the volatile solvent includes one or more of dihydroterpineol, terpineol, and dihydroterpineol acetate.

4. The ink composition according to claim 1, wherein the plurality of organic ligands includes an aliphatic thiol, carboxylic acid, or amine.

5. The ink composition according to claim 1, wherein the plurality of organic ligands includes dodecanethiol.

6. The ink composition according claim 1, wherein the ratio by mass of the semiconductor nanoparticles to the volatile solvent is between 2:1 and 4:1.

7. The ink composition according claim 1, wherein the ink composition substantially does not include a matrix material or material other than the volatile solvent, the semiconductor nanoparticles, and the organic ligand surrounding the semiconductor nanoparticles.

* * * * *